United States Patent
Baranowski et al.

(10) Patent No.: US 11,298,973 B2
(45) Date of Patent: Apr. 12, 2022

(54) WHEEL COMPONENT AND METHOD FOR PRODUCING A WHEEL COMPONENT

(71) Applicant: Ford Global Technologies, LLC, Dearborn, MI (US)

(72) Inventors: Thomas Baranowski, Wuerselen (DE); Maik Broda, Wuerselen (DE); Markus Franzen, Stolberg (DE); Pascal Rebmann, Weilerswist (DE)

(73) Assignee: Ford Global Technologies, LLC, Dearborn, MI (US)

( * ) Notice: Subject to any disclaimer, the term of this patent is extended or adjusted under 35 U.S.C. 154(b) by 792 days.

(21) Appl. No.: 16/129,840

(22) Filed: Sep. 13, 2018

(65) Prior Publication Data

US 2019/0118577 A1    Apr. 25, 2019

(30) Foreign Application Priority Data

Oct. 25, 2017    (DE) .......................... 102017219061.2

(51) Int. Cl.
*B60B 1/14*    (2006.01)
*B60B 3/10*    (2006.01)
(Continued)

(52) U.S. Cl.
CPC .................. *B60B 1/14* (2013.01); *B60B 3/10* (2013.01); *B60B 3/14* (2013.01); *B60B 5/02* (2013.01);
(Continued)

(58) Field of Classification Search
CPC ................ B60B 1/14; B60B 3/10; B60B 5/02
See application file for complete search history.

(56) References Cited

U.S. PATENT DOCUMENTS 4,017,348 A      4/1977   Shumaker
4,173,992 A  *  11/1979   Lejeune ................... B60B 5/02
                                                 152/381.3
(Continued)

FOREIGN PATENT DOCUMENTS

DE          4202287 A1     8/1992
DE         10145630 A1     4/2003
(Continued)

OTHER PUBLICATIONS

Sloan, Jeff, "JEC World 2017: Show Report, Part 1," Composites World. Posted in blog Mar. 23, 2017. Downloaded from http://www.compositesworld.com/blog/post/jec-world-2017-show-report-part-1, Apr. 17, 2017.
(Continued)

*Primary Examiner* — Jason R Bellinger
(74) *Attorney, Agent, or Firm* — Vincent Mastrogiacomo; Carlson, Gaskey & Olds, P.C.

(57) ABSTRACT

This disclosure relates to a wheel component (1, 20) for a wheel of a vehicle, having a hub (2), which can be connected in a rotationally secure manner to a hub flange of the vehicle and which at least partially comprises a metal material, a rim (4, 21) for receiving a tire of the wheel, and spokes (7) which connect the hub (2) to the rim (4, 21). The wheel component includes at least one spoke (7) including a spoke portion (8, 24), which comprises an injection-molded thermoplastic material, and further including a spoke reinforcement element (9, 25) at least partially embedded into the spoke portion. The spoke reinforcement element at least partially comprises a fiber-reinforced plastic material.

10 Claims, 6 Drawing Sheets

(51) Int. Cl.
*B60B 5/02* (2006.01)
*B60B 3/14* (2006.01)
*B60B 9/00* (2006.01)

(52) U.S. Cl.
CPC ........ *B60B 9/005* (2013.01); *B60B 2310/204* (2013.01); *B60B 2310/329* (2013.01); *B60B 2320/12* (2013.01); *B60B 2320/50* (2013.01); *B60B 2360/10* (2013.01); *B60B 2360/34* (2013.01); *B60B 2900/111* (2013.01); *B60B 2900/115* (2013.01); *B60B 2900/313* (2013.01)

(56) References Cited

U.S. PATENT DOCUMENTS

| | | | | |
|---|---|---|---|---|
| 4,471,999 | A * | 9/1984 | Browne | B60C 23/18 301/6.91 |
| 4,532,097 | A | 7/1985 | Daniels et al. | |
| 4,749,235 | A * | 6/1988 | McDougall | B60B 5/02 301/64.703 |
| 5,104,199 | A * | 4/1992 | Schlanger | B60B 1/003 301/64.704 |
| 5,277,479 | A * | 1/1994 | Koyama | B60B 5/02 301/6.91 |
| 6,520,595 | B1 * | 2/2003 | Schlanger | B60B 1/003 301/59 |
| 10,500,895 | B2 * | 12/2019 | Renner | B29C 65/56 |
| 10,576,779 | B2 * | 3/2020 | Seidl | B60B 21/12 |
| 2005/0104441 | A1 | 5/2005 | Bertelson | |
| 2005/0121970 | A1 * | 6/2005 | Adrian | B29C 70/44 301/64.702 |
| 2007/0138859 | A1 * | 6/2007 | Mercat | B60B 5/02 301/67 |
| 2008/0191543 | A1 * | 8/2008 | Saillet | B60B 21/062 301/55 |
| 2013/0049443 | A1 | 2/2013 | Hess et al. | |
| 2014/0346845 | A1 | 11/2014 | Renner | |

FOREIGN PATENT DOCUMENTS

| | | | | |
|---|---|---|---|---|
| DE | 102011077834 | A1 | 12/2012 | |
| DE | 102016210756 | A1 * | 12/2016 | ............... B60B 3/10 |
| EP | 1304238 | A1 | 4/2003 | |
| EP | 2826639 | A1 * | 1/2015 | ............. B60B 1/003 |
| FR | 2908079 | A1 * | 5/2008 | .......... B60B 21/062 |
| WO | 2015069111 | A1 | 5/2015 | |

OTHER PUBLICATIONS

Smart forvision—BASF and smart, viewed on Aug. 28, 2018. Downloaded from: http://www.smartforvision.basf.com/#kunststoff-felge.

* cited by examiner

WHEEL COMPONENT AND METHOD FOR PRODUCING A WHEEL COMPONENT

RELATED APPLICATION(S)

This application claims priority to German Patent Application No. 102017219061.2, filed on Oct. 25, 2017, the entirety of which is herein incorporated by reference.

TECHNICAL FIELD

The present disclosure relates to a wheel component for a wheel of a vehicle, and to a method for producing the same.

BACKGROUND

Motor vehicles generally have four wheels, each of which includes a wheel component and a tire. The wheel component includes a central hub, at least one spoke, and a rim. The rim generally provides an outer portion of the wheel component and holds the tire.

Known wheel components are commonly made of steel or aluminum. Less commonly, wheel components may also be made of a thermoplastic material in place of aluminum, for example. A thermoplastic material has a lower density and can in comparison with aluminum be used to produce wheel components with relatively complex forms, whereby special design requirements can be complied with. Thermoplastic wheel components are known but, at present, can meet only the requirements of small vehicles (i.e., subcompact cars) and therefore cannot be used in a large number of vehicles in the industry. Various wheel components have been proposed, some of which will now be described herein.

US 2014/0346845 A1 relates to a wheel component which has a rim and a spoke structure which is connected thereto and which is produced from fiber-reinforced plastic material. An insert is embedded at the center of the spoke structure in the fiber-reinforced material. The insert projects in at least one region beyond the surface of the fiber-reinforced plastic material, whereby at least one contact face is formed.

U.S. Pat. No. 4,017,348 A relates to a composite wheel for a heavy-goods vehicle having a cylinder element which has an inner layer which comprises a laminated tape structure which is wound on a non-circular mandrel. The cylinder element has a large number of formed portions comprising chopped fibers in an epoxy resin. The inner surface of each portion corresponds to the non-circular tape structure and the outer surface forms the tire bead retention member and the drop center portion of the wheel. An outer layer comprising a laminated tape structure surrounds the formed portions. A wheel web element which is produced from chopped fibers in an epoxy resin has an outer surface which corresponds to the non-circular configuration of the cylinder element. The web element comprises two portions which are fixed to the cylinder element.

WO 2015/069111 A1 relates to a wheel which is suitable for a vehicle and which has a rim having a rim bed. The rim bed has a wound tape which has a fiber-reinforced thermoplastic or thermoset polymer matrix.

US 2013/0049443 A1 relates to a wheel for a motor vehicle having a wheel member having a rim tape for receiving a tire, a rim star or a wheel disk and through-openings which are formed in the rim star or the wheel disk for fixing means for fixing the wheel to a wheel hub of a motor vehicle. The wheel is produced from a polymer material and at least one reinforcement element is received in the rim tape for reinforcement.

US 2005/0104441 A1 relates to a fiber-reinforced truck wheel and a method for producing a fiber-reinforced truck wheel. The fiber-reinforced truck wheel is produced by helical winding of a suitable fiber cloth in order to form a rim and by hardening the rim and a disk in a mold.

U.S. Pat. No. 4,532,097 A relates to a pre-mold for a fiber-reinforced plastic vehicle wheel. The pre-mold has a substantially planar spoke portion which has a resin reinforced with randomly orientated fibers, wherein each fiber has a length of approximately from 1.27 cm to 5.08 cm. The pre-mold has a first tubular portion, which a fiber-reinforced resin film, and which surrounds the spoke portion about an axis orientated substantially perpendicularly to the plane of the spoke portion. The pre-mold further has a second tubular portion which is arranged substantially coaxially with respect to the first tubular portion, surrounds it, and has a fiber-reinforced resin film. The fiber-reinforced resin film of the first and second tubular portions has randomly distributed, chopped fibers approximately from 1.27 cm to 5.08 cm long and continuous fibers at a ratio of approximately from 1:1 to 1:4. A fiber-reinforced plastic wheel is produced by compression molding the pre-mold.

A publication "JEC World 2017: Show report, part 1" discloses a carbon-fiber-reinforced plastic wheel component which comprises either exclusively the fiber-reinforced plastic material or aluminum and the fiber-reinforced plastic material.

SUMMARY

A wheel component according to an exemplary aspect of the present disclosure includes, among other things, at least one spoke comprising a spoke portion and a spoke reinforcement element at least partially embedded into the spoke portion. The spoke portion comprises a thermoplastic material, and the spoke reinforcement element at least partially comprises a fiber-reinforced plastic material.

In a further non-limiting embodiment of the foregoing wheel component, the wheel component includes a hub configured to be connected in a rotationally secure manner to a hub flange of a vehicle. The hub at least partially comprises a metal material. Further, the wheel component includes a rim configured to receive a tire, and the at least one spoke connects the hub to the rim.

In a further non-limiting embodiment of any of the foregoing wheel components, the wheel component further includes a retention element arranged on the hub. Additionally, the spoke reinforcement element includes a loop projecting at a hub side from the at least one spoke, and the loop is guided around the retention element.

In a further non-limiting embodiment of any of the foregoing wheel components, the spoke reinforcement element is constructed as a flexible tape.

In a further non-limiting embodiment of any of the foregoing wheel components, the retention element has a drop-like shape in cross-section, and a rounded portion of the retention element is arranged toward of a center of the hub.

In a further non-limiting embodiment of any of the foregoing wheel components, the hub is substantially cylindrical.

In a further non-limiting embodiment of any of the foregoing wheel components, at least one anchor element is embedded in the spoke portion and is arranged on an outer face of the hub.

In a further non-limiting embodiment of any of the foregoing wheel components, the anchor element is substantially T-shaped.

In a further non-limiting embodiment of any of the foregoing wheel components, the rim has a rim portion comprising a thermoplastic material and on which a reinforcement element is at least partially arranged, and the rim reinforcement element at least partially comprises a fiber-reinforced plastic material.

In a further non-limiting embodiment of any of the foregoing wheel components, the spoke portion is connected in a materially engaging manner to the spoke reinforcement element, and the rim portion is connected in a materially engaging manner to the rim reinforcement element.

In a further non-limiting embodiment of any of the foregoing wheel components, a loop of the spoke reinforcement element projects out of the at least one spoke at a rim side and is guided around at least a portion of the rim reinforcement element.

In a further non-limiting embodiment of any of the foregoing wheel components, the spoke portion and the rim portion are connected to one another monolithically.

In a further non-limiting embodiment of any of the foregoing wheel components, the at least one spoke is one of a plurality of substantially similar spokes.

A method for producing a wheel component according to an exemplary aspect of the present disclosure includes, among other things, producing a subassembly by connecting at least one spoke reinforcement element, which at least partially comprises a fiber-reinforced plastic material, to a hub configured to be connected to a hub flange of a vehicle. The hub is substantially cylindrical and at least partially comprises a metal material.

In a further non-limiting embodiment of the foregoing method, producing the subassembly includes guiding a loop of the at least one spoke reinforcement element around a retention element of the hub.

In a further non-limiting embodiment of any of the foregoing methods, the retention element has a drop-like shape in cross-section, and a rounded portion of the retention element is arranged toward of a center of the hub.

In a further non-limiting embodiment of any of the foregoing methods, the method includes injection molding the subassembly with a thermoplastic material by injecting the thermoplastic material into an injection-molding tool so that axial end sides of the hub are not covered with the thermoplastic material.

In a further non-limiting embodiment of any of the foregoing methods, the method includes at least partially curing the thermoplastic material inside the injection-molding tool, and opening the injection-molding tool and removing the subassembly which is injection-molded with the thermoplastic material from the open injection-molding tool.

In a further non-limiting embodiment of any of the foregoing methods, the injection-molded subassembly is one of a solid component portion, a foamed-on component portion, a component portion constructed as a hollow member, and a component portion having a rib structure.

In a further non-limiting embodiment of any of the foregoing methods, a rim portion of a rim of the wheel component is formed at the same time during the injection-molding of the subassembly using the thermoplastic material.

DETAILED DESCRIPTION

Figure 1:
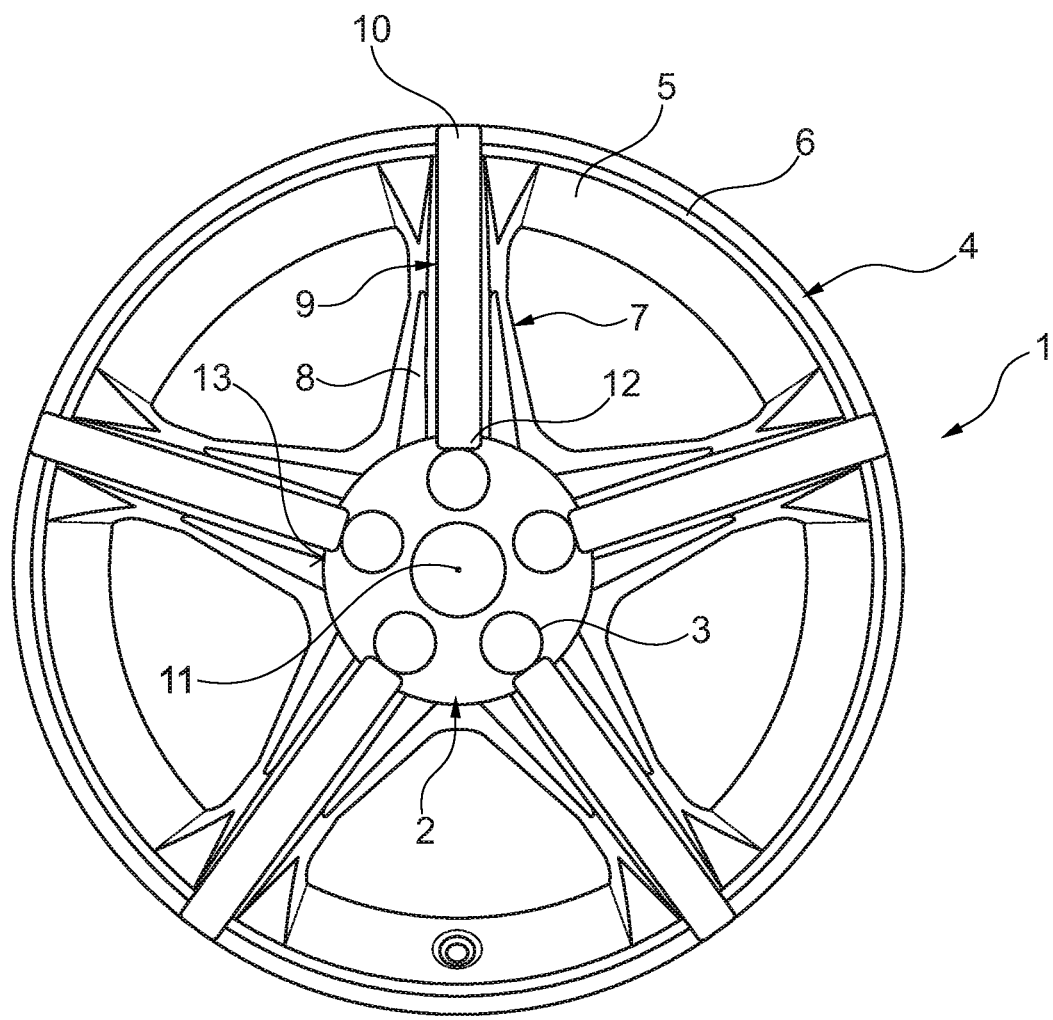
FIG. 1 is a schematic illustration of an example wheel component.

The present disclosure relates to a wheel component for a wheel of a vehicle, and to a method for producing the same. An example wheel component according to an exemplary aspect of the present disclosure includes at least one spoke comprising a spoke portion and a spoke reinforcement element at least partially embedded into the spoke portion. The spoke portion comprises a thermoplastic material, and the spoke reinforcement element at least partially comprises a fiber-reinforced plastic material. The disclosed arrangement provides a number of benefits which will be appreciated from the following written description.

An object of this disclosure is to provide a lightweight wheel component for a vehicle wheel which withstands high mechanical loads. A reduction of the weight of the wheel component has various advantages. First, the total weight of the vehicle is reduced by reducing the weight of wheel component, which leads to a reduction of the fuel consumption. Furthermore, the unsprung mass of the vehicle is reduced by reducing the weight of wheel components, which results in an improved driving quality, improved driving comfort and improved behavior on bends. Furthermore, the rotation mass of the wheel component is reduced by reducing the weight of the wheel component, which contributes to an improved acceleration behavior.

The object is achieved accordingly by providing a wheel component with at least one spoke, which has a spoke portion, which comprises an injection-molded thermoplastic material and in which a spoke reinforcement element, which at least partially comprises a fiber-reinforced plastic material, is at least partially embedded. In this way, a wheel component partially including thermoplastic is capable of meeting the requirements placed on larger and heavier vehicles, because the wheel component exhibits a higher level of rigidity and strength in critical areas.

It should be noted that the features and measures set out individually in the following description can be combined with each other in any technically advantageous manner and set out additional embodiments of this disclosure. The description additionally characterizes and specifies the disclosure in particular in connection with the Figures. The spoke reinforcement element may also comprise a hard foam.

For avoidance of doubt, in this disclosure, the term "wheel" is inclusive of a "wheel component" and a "tire." In other words, a "tire" forms a portion of a "wheel" but is a distinct structure from the "wheel component." Furthermore, the wheel component includes a central hub, at least one spoke, and an outer rim. The wheel component is not referred to herein as a "rim." Rather, the individual components of the wheel component are identified in a technically correct manner. In particular the term "rim" strictly speaking should be understood only to be the outer portion of the wheel component receiving the tire, not the entire wheel component, which is particularly the case when the wheel component according to the disclosure has at least two separately produced portions which are connected to each other.

In this disclosure, a relatively lightweight wheel component is provided because, except for the hub of the wheel component, no metal components are present. In particular, the wheel component according to the disclosure is lighter than a correspondingly constructed wheel component produced completely from aluminum. Further, the arrangement and configuration of the spokes allows the wheel component to receive higher mechanical loads than a wheel component, which is produced only from a thermoplastic material. The wheel component is thereby also suitable for use in heavier vehicles (e.g., so-called "B vehicles," "C vehicles," and "D vehicles"; also known as "B-Class vehicles," C-Class vehicles," and "D-Class vehicles"). Furthermore, the production of the spoke portions from the thermoplastic material using an injection-molding method also makes more complex configuration of the wheel component possible, whereby in particular the design freedom is increased. The spoke portion can be produced in particular without a complex reprocessing of the wheel component occurring.

The thermoplastic material of the spoke portion and the rim portion may be fiber-reinforced and, for example, a polyamide, polypropylene, acrylonitrile butadiene styrene (ABS), or other suitable thermoplastic materials with short or long reinforcement fibers contained therein. The reinforcement fibers can be produced, for example, from carbon, glass, aramid, or the like. Furthermore, the plastic material can be at least partially foamed-on during the component manufacturing process by physical or chemical propellants.

The spoke reinforcement element may be constructed as a flexible tape. The tape may have unidirectionally, bidirectionally or multidirectionally orientated fibers. The tape may have different layers, which differ from each other as a result of the respective orientation of the fibers contained therein. Two or more identically or differently formed, tape-like spoke reinforcement elements can also be partially or completely embedded in a spoke. A portion of the respective tape-like spoke reinforcement element can project at one or both ends of the respective spoke. These portions can be used to fix the spoke to the rim and/or the hub. The plastic component of the spoke reinforcement element may be similar or identical to the plastic component of the thermoplastic material. It is thereby possible to connect these plastic components to each other in a materially engaging manner with the action of heat, in particular during an injection-molding operation. Alternatively, the spoke reinforcement element may be constructed as an organic sheet or organic film.

Assembly holes are formed in the hub and can be connected in a rotationally secure manner to the hub flange of the vehicle. The assembly holes engage screw bolts which are fixed to the hub flange or wheel screws which are screwed in threaded holes in the hub flange when the wheel component is fixed to the hub flange. In one example, the hub can be produced partially or completely from aluminum.

The rim for receiving a tire of the wheel can also be at least partially produced from a thermoplastic material which may or may not be fiber-reinforced and/or foamed-on. Alternatively, the rim may be at least partially produced from a metal material.

The spokes can extend between the hub and rim linearly or radially, or in a curved manner. Further, the spokes can form a coherent spoke structure or can be constructed independently of each other.

According to an embodiment of this disclosure, at least one retention element is arranged on the hub, wherein the spoke reinforcement element is constructed as a flexible tape, and at least one loop of the spoke reinforcement element projecting at the hub side from the spoke is guided around the retention element at the hub side. The reinforcement element is accordingly constructed, for example, as a tape. By the loop being guided at the hub side around the retention element, the spoke is connected in a non-positive-locking manner to the hub in order also to be able to transmit high radial forces from the spoke to the hub, and vice versa. The retention element is preferably constructed integrally in the hub. The hub may have, for each spoke, a separate retention element. The fiber-reinforced tape-like spoke reinforcement element can be guided around the retention element at the hub side to produce the wheel component, can be subsequently guided as far as a portion of the rim and can be guided around this portion. Subsequently, the spoke reinforcement element can be guided back to the hub again and around the retention element again at the hub side. The more often this operation is carried out, the higher is the degree of reinforcement achieved with the spoke reinforcement element.

The retention element has a drop-like shape in cross-section, and in particular may be teardrop-shaped in cross-section. The rounded portion of the retention element is directed in the direction of a center of the hub. The spoke reinforcement element which is constructed as a flexible fiber-reinforced tape can thereby abut a rounded face of the retention element, whereby a likelihood of breakage of reinforcement fibers of the spoke reinforcement element is drastically reduced if not prevented altogether.

In an additional embodiment, the hub is constructed in a substantially cylindrical manner, and at least one anchor element, which is embedded in the spoke portion, is arranged on an outer covering face of the hub. The connection between the spoke portion and the hub is thereby reinforced. In the embodiment, the anchor element is injection-molded in a positive-locking manner when the spoke is produced by means of an injection-molding method. The hub preferably has, for each spoke, at least one anchor element. The anchor elements and the spoke reinforcement elements allow an unrestricted force flow from the hub into the spokes, and vice versa.

The anchor element is constructed in a T-shaped manner. The anchor element thereby has a first web which extends radially relative to the hub and on the end of which facing away from the hub a tangentially extending second web is arranged. Alternatively, the anchor element can be constructed, for example, in a nail-like manner and may have a circular nail head.

According to another embodiment, the spoke is constructed to be solid, foamed-on, as a hollow member or so as to have a rib structure. As a result of the configuration of the spoke, the wheel component can be optimally adapted to the respective requirements. By the spoke being constructed as a hollow member, for example, using a fluid injection technique, such as a gas injection technique or water injection technique, the weight of the wheel component can be reduced. As a result of the configuration of the spoke with the rib structure, the weight of the wheel component can also be reduced while the rigidity of the spoke is increased by the rib structure.

According to another embodiment, the rim has at least one rim portion which comprises an injection-molded thermoplastic material and on which at least one rim reinforcement element, which at least partially comprises a fiber-reinforced plastic material, is at least partially arranged. The rim portion may partially or completely form a rim bed of the rim. The rim reinforcement element may be constructed as a flexible tape which, for example, is wound so as to extend around the rim bed. The tape may have unidirectionally, bidirectionally, or multidirectionally orientated fibers. The tape may have different layers which differ from each other as a result of the orientation of the fibers contained therein. Two or more identically or differently constructed tape-like rim reinforcement elements can also be partially or completely arranged on the rim. The plastic component of the rim reinforcement element can be similar or identical to the plastic component of the thermoplastic material of the rim portion. These plastic components can thereby be connected to each other in a materially engaging manner under the action of heat, in particular during an injection-molding operation. Alternatively, the rim reinforcement element can be constructed as an organic sheet or organic film.

Another embodiment makes provision for at least one loop of the spoke reinforcement element projecting out of the spoke at the rim side to be guided at the radially outer side around at least a portion of the rim reinforcement element. The spoke is thereby connected to the rim in a non-positive-locking manner in order to be able to transmit radial forces from the spoke to the rim, and vice versa.

According to another embodiment, the spoke portion and the rim portion are connected to each other monolithically. A higher level of strength is thereby imparted to the wheel component. In particular, the spoke portion and the rim portion can be produced during a single injection-molding operation using the same injection-molding material. The simultaneous production of the spoke portion and rim portion in a single injection-molding process allows the foaming-on of the thermoplastic material for further reduction of the weight. In this case, the foaming process can be brought about by a physical or chemical propellant.

According to another embodiment, the spoke portion is connected in a materially engaging manner to the spoke reinforcement element and/or the rim portion is connected in a materially engaging manner to the rim reinforcement element. The strength of the wheel component is thereby further increased. The materially engaging connection between the spoke portion and the spoke reinforcement element and/or the rim portion and the rim reinforcement element can be achieved by using a plastic component which is similar or identical to the injection-molded thermoplastic material in the spoke reinforcement element or rim reinforcement element and an action of heat during the production of the wheel component.

An example method of making the above-discussed wheel component includes the steps of: producing a subassembly by connecting a spoke reinforcement element, which at least partially comprises a fiber-reinforced plastic material, to a hub which can be connected to a hub flange of the vehicle and which is constructed in a substantially cylindrical manner and which at least partially comprises a metal material; introducing the subassembly into the open injection-molding tool and closing the injection-molding tool; injection-molding the subassembly with a thermoplastic material by injecting the thermoplastic material into the closed injection-molding tool so that axial end sides of the hub are not covered at least predominantly with the thermoplastic material; at least partial curing of the thermoplastic material inside the injection-molding tool; and opening the injection-molding tool and removing the subassembly which is injection-molded with the thermoplastic material from the open injection-molding tool.

The advantages mentioned above with regard to the wheel component are accordingly connected with the method. In particular, the wheel component can be produced according to one of the above-mentioned embodiments or any combination of at least two of these embodiments with each other using the method. Furthermore, embodiments of the wheel component can correspond to embodiments of the method, and vice versa, even if reference is not explicitly made thereto below in the individual case.

In order to produce the subassembly per spoke, for example, one tape-like flexible spoke reinforcement element can be guided around an individual retention element on the hub. The subassembly produced in this manner can be introduced into the open injection-molding tool by the spoke reinforcement elements being fixed in the injection-molding tool in the desired shape thereof. Subsequently, the injection-molding tool can be closed in order to be able to injection-mold the subassembly with the thermoplastic material so that axial end sides of the hub are not covered at least predominantly with the thermoplastic material. The axial end sides can thereby be used for robustly contacting the hub flange and wheel screws or wheel nuts. When the subassembly is injection-molded, one rim portion can be constructed at the same time as a spoke portion. By adding a physical or chemical propellant to the thermoplastic material, the spoke portion and/or the rim portion can at least partially be foamed-on. After the injection-molding of the subassembly, the thermoplastic material can be partially or completely cooled, in particular with heat discharge, inside the injection-molding tool as far as the dimensionally stable removal temperature.

According to another embodiment, a solid component portion, a foamed-on component portion, a component portion constructed as a hollow member, or a component portion having a rib structure is formed from the thermoplastic material when the subassembly is injection-molded. The advantages mentioned above with regard to the corresponding embodiment of the wheel component are accordingly connected with this embodiment.

Another embodiment makes provision for a portion of a rim of the wheel component to be formed at the same time during the injection-molding of the subassembly using the thermoplastic material. In this case, the rim can be connected to the spokes in particular in a materially engaging manner or produced monolithically with the spokes. By adding a physical or chemical propellant to the thermoplastic material, the spoke portion and/or the rim portion can at least partially be foamed-on.

Reference now will be made to FIGS. 1-6. In the various Figures, the same components are always indicated with the same reference numerals, for which reason they are generally also only described once.

FIG. 1 is a schematic illustration of an embodiment of a wheel component 1 according to the disclosure for a wheel of a vehicle, which is not shown. The tire of the wheel is also not shown.

The wheel component 1 has a hub 2 which can be connected in a rotationally secure manner to a hub flange (not shown) of the vehicle, and which completely comprises a metal material, in particular aluminum. The hub 2 is constructed to be solid and substantially cylindrical. Three or more, for example five, assembly holes 3 for assembling the wheel component 1 on the hub flange are constructed in the hub 2. Additional details for constructing the hub 2 will be appreciated from FIGS. 3 and 4.

The wheel component 1 also has a rim 4 for receiving a tire (which, again, is not shown) of the wheel. The rim 4 has a rim portion 5 which comprises an injection-molded thermoplastic material and on which there is arranged a rim reinforcement element 6, which at least partially comprises a fiber-reinforced plastic material. The rim reinforcement element 6 is constructed as a flexible tape which is wound around the rim portion 5 to form a rim bed. The rim portion 5 can be connected to the rim reinforcement element 6 in a materially engaging manner.

Furthermore, the wheel component 1 has, for example, five spokes 7 which connect the hub 2 to the rim 4. Each spoke 7 has a spoke portion 8, which comprises an injection-molded thermoplastic material, and in which there are embedded portions of a spoke reinforcement element 9, which at least partially comprises a fiber-reinforced plastic material. The spoke reinforcement element 9 is constructed as a flexible tape in this example. Each spoke portion 8 can be constructed to be solid, foamed-on, as a hollow member or so as to have a rib structure, which is not shown. The rim portion 5 and the spoke portion 8 are connected to each other monolithically. A loop 10 of the spoke reinforcement element 9 projecting out of the respective spoke 7 is guided at a radially outer side around at least a portion of the rim reinforcement element 6. The spoke portion 8 can be connected in a materially engaging manner to the spoke reinforcement element 9. The spokes 7 or spoke portions 8 are connected to each other monolithically at the hub side and thus form a coherent spoke structure.

Figure 3:
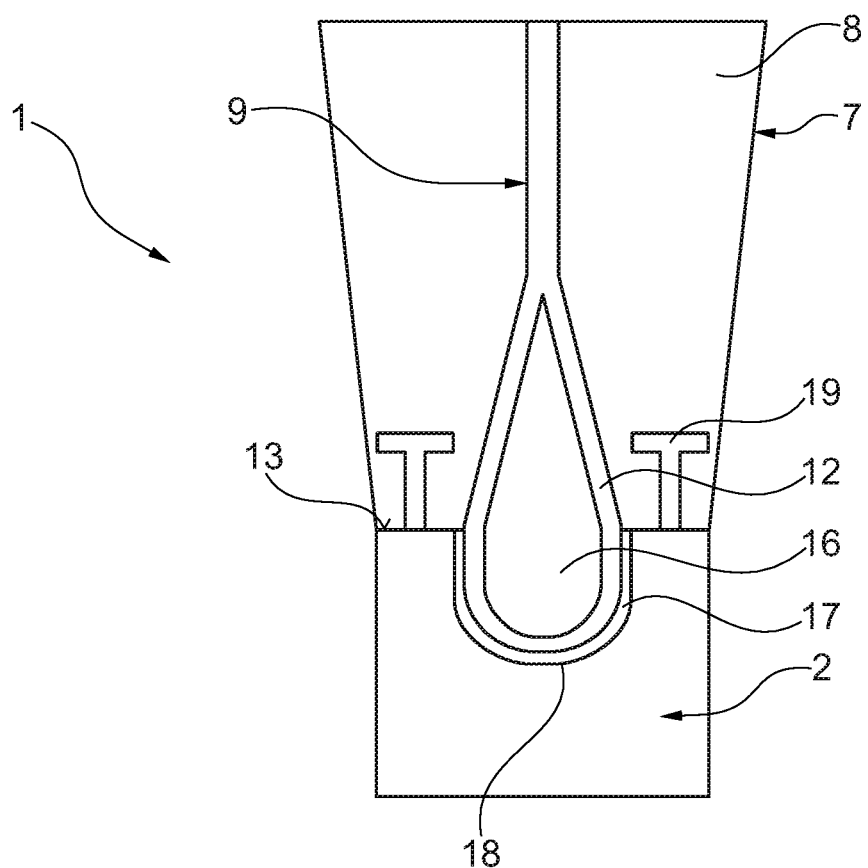
FIG. 3 is a schematic cross-sectional view illustrating an aspect of the wheel component of FIG. 1.
Figure 4:
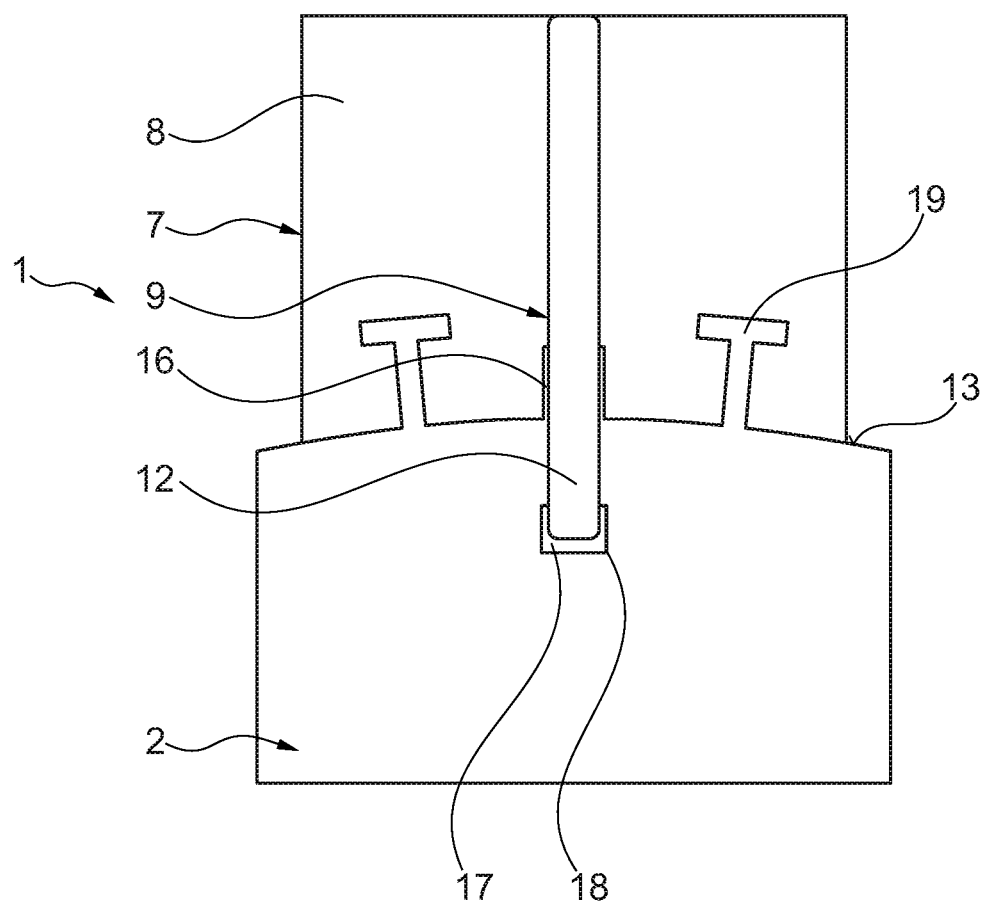
FIG. 4 is another schematic cross-sectional view illustrating the aspect of FIG. 3.

For each spoke 7, an individual retention element which is shown in FIGS. 3 and 4 is arranged on the hub 2. Each retention element has a drop-like shape in cross-section, the rounded portion of which is directed in the direction of a center 11 of the hub 2. A loop 12 of the spoke reinforcement element 9 projecting out of the respective spoke 7 at the hub side is guided around the respective retention element at the hub side.

A plurality of anchor elements 19 which are shown in FIGS. 3 and 4 are arranged on an outer covering face 13 of the hub 2 and are embedded in the spoke portion 8 of the respective spoke 7. Each anchor element is constructed in a T-shaped manner.

Figure 2:
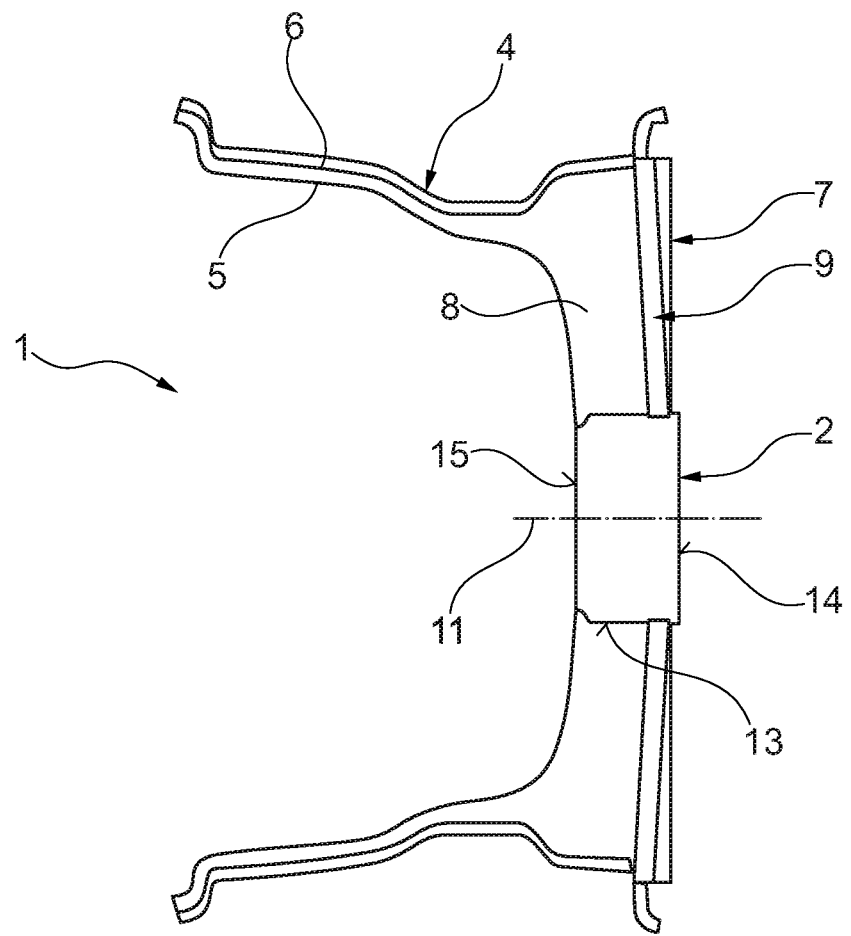
FIG. 2 is a schematic cross-sectional view of the wheel component of FIG. 1.

FIG. 2 is a schematic cross-section of the wheel component 1 shown in FIG. 1. FIG. 2 illustrates the rim portion 5 wound almost completely with the rim reinforcement element 6. It can further be seen that the hub 2 has axial assembly faces 14 and 15 which are not covered with the thermoplastic material.

FIG. 3 is a schematic cross-section of a detail of the wheel component 1 shown in FIG. 1. The connection region between the hub 2 and a spoke 7 is shown. The section is taken parallel with a longitudinal center axis of the wheel component 1 extending through the center of the hub 2 shown in FIGS. 1 and 2.

For each spoke 7, an individual retention element 16, of which only one is shown in FIG. 3, is arranged on the hub 2. The retention element 16 has a drop-like shape in the shown cross-section, the rounded portion of which is directed in the direction of the center 11 (FIGS. 1 and 2) of the hub 2. A loop 12 of the spoke reinforcement element 9 projecting at the hub side from the shown spoke 7 is guided around the retention element 16 at the hub side. The retention element 16 projects into a recess 18 in the hub 2 with the rounded portion thereof so as to leave a U-shaped guide slot 17.

There are arranged on the outer covering face 13 of the hub 2 a plurality of T-shaped anchor elements 19 which are each embedded in the spoke portion 8 of the respective spoke 7. The spoke portion 8 surrounds the anchor elements 19 in a positive-locking manner.

FIG. 4 is another schematic cross-section of the detail of the wheel component 1 shown in FIG. 3. The section is taken perpendicularly to the longitudinal center axis of the wheel component 1 extending through the center of the hub 2 shown in FIGS. 1 and 2.

In comparison with FIG. 3, the tape-like configuration of the spoke reinforcement element 9 can be seen. It is further possible to see how the retention element 16 is arranged integrally on the hub 2.

Figure 5:
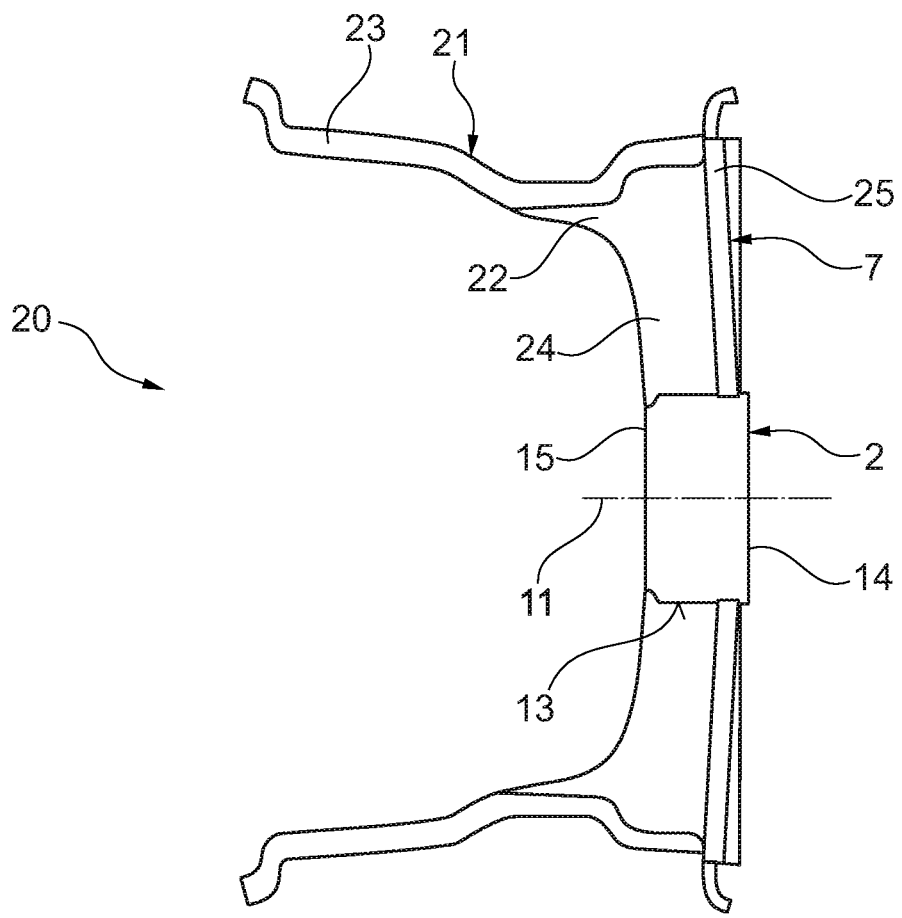
FIG. 5 is a schematic cross-sectional of another example wheel component.

FIG. 5 is a schematic cross-section of an additional embodiment of a wheel component 20 according to the disclosure for a wheel (not shown) of a vehicle (not shown).

The wheel component 20 has a hub 2 which can be connected in a rotationally secure manner to a hub flange (not shown) of the vehicle and which completely comprises a metal material, in particular aluminum. The hub 2 is constructed to be solid and substantially cylindrical. Assembly holes (not shown) for assembling the wheel component 20 on the hub flange are constructed on the hub 2.

Furthermore, the wheel component 20 has a rim 21 for receiving a tire (not shown) of the wheel. The rim 21 has a rim portion 22 which comprises an injection-molded thermoplastic material and on which a rim reinforcement element 23 which at least partially comprises a fiber-reinforced plastic material is arranged. The rim reinforcement element 23 is constructed as a flexible tape which is wound around the rim portion 22. The rim portion 22 may be connected in a materially engaging manner to the rim reinforcement element 23. Unlike the embodiment shown in FIGS. 1 to 4, the rim portion 22 extends axially only over approximately half of the rim width.

Furthermore, the wheel component 20 has a plurality of spokes 7 which connect the hub 2 to the rim 21. Each spoke 7 has a spoke portion 24 which comprises an injection-molded thermoplastic material and in which portions of a spoke reinforcement element 25 which at least partially comprise a fiber-reinforced plastic material are embedded. The spoke reinforcement element 25 is constructed as a flexible tape. Each spoke portion 24 may be constructed to be solid, foamed-on, as a hollow member or so as to have a rib structure which is not shown. The spoke portion 24 and the rim portion 22 are connected to each other monolithically. A loop of the respective spoke reinforcement element 25, which loop is not shown, projects at the rim side from the respective spoke 7, and can be guided at a radially outer side around at least a portion of the rim reinforcement element 23. The spoke portion 24 can be connected to the spoke reinforcement element 25 in a materially engaging manner. The spoke portions 24 can be connected to each other monolithically at the hub side and thus form a coherent spoke structure.

For each spoke 7, an individual retention element, which is not shown, is arranged on the hub 2 similar to that shown in FIGS. 3 and 4. Each retention element has a drop-like shape in cross-section, the rounded portion of which is directed in the direction of a center 11 of the hub 2. A loop of the respective spoke reinforcement element 25, which loop is not shown and projects at the hub side from the respective spoke 7, is guided around the respective retention element at the hub side.

Again, like in FIGS. 3 and 4, a plurality of anchor elements, which are not shown, may be arranged on an outer covering face 13 of the hub 2 and are embedded in the spoke portion 24 of the respective spoke 7. Each anchor element is constructed in a T-shaped manner.

Figure 6:
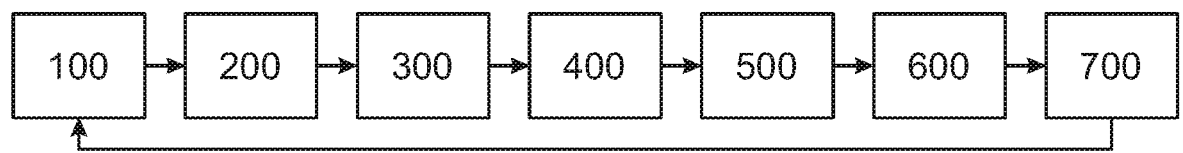
FIG. 6 is a flow chart representative of an example method.

FIG. 6 is a flow chart representative of an example method for producing a wheel component for a wheel of a vehicle using an injection-molding tool.

In the method step 100, an injection-molding tool is open. In the method step 200, a subassembly is produced by connecting spoke reinforcement elements, which at least partially comprise a fiber-reinforced plastic material or a hard foam, to a hub, which can be connected to a hub flange of the vehicle and which is constructed in a substantially cylindrical manner and which at least partially comprises a metal material. This subassembly can also contain the rim reinforcement element so that the wheel component can be produced in a single injection-molding process.

In the method step 300, the subassembly is introduced into the open injection-molding tool, wherein the spoke reinforcement elements are fixed in a desired form. In the method step 400, the injection-molding tool is closed.

In step 500, the subassembly is injection-molded with a thermoplastic material by injection-molding the thermoplastic material into the closed injection-molding tool so that axial end sides of the hub are at least predominantly not covered with the thermoplastic material. When the subassembly is injection-molded with the thermoplastic material, a solid component portion, a foamed-on component portion, a component portion, which is constructed as a hollow member, or a component portion having a rib structure can be formed. During the injection-molding of the subassembly using the thermoplastic material, at the same time a portion of a rim of the wheel component can be formed. Furthermore, an at least partial curing of the thermoplastic material inside the injection-molding tool can be carried out in method step 500.

In the method step 600, the injection-molding tool is opened. In the method step 700, the subassembly which is injection-molded with the thermoplastic material is removed from the open injection-molding tool.

It should be understood that terms such as "about," "substantially," and "generally" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A wheel component, comprising:
   at least one spoke comprising a spoke portion and a spoke reinforcement element at least partially embedded into the spoke portion, wherein the spoke portion comprises a thermoplastic material and the spoke reinforcement element at least partially comprises a fiber-reinforced plastic material;
   a hub configured to be connected to a hub flange of a vehicle, wherein the hub at least partially comprises a metal material; and
   a rim configured to receive a tire, wherein the at least one spoke connects the hub to the rim,
   wherein the rim has a rim portion comprising a thermoplastic material and on which a reinforcement element is at least partially arranged,
   wherein the rim reinforcement element at least partially comprises a fiber-reinforced plastic material, and
   wherein a loop of the spoke reinforcement element projects out of the at least one spoke at a rim side and is guided around at least a portion of the rim reinforcement element.

2. The wheel component as recited in claim 1, further comprising:
   a retention element arranged on the hub; and
   wherein the spoke reinforcement element includes a loop projecting at a hub side from the at least one spoke, and
   wherein the loop is guided around the retention element.

3. The wheel component as recited in claim 2, wherein the spoke reinforcement element is constructed as a flexible tape.

4. The wheel component as recited in claim 2, wherein a rounded portion of the retention element is arranged toward of a center of the hub.

5. The wheel component as recited in claim 1, wherein the hub is substantially cylindrical.

6. The wheel component as recited in claim 5, wherein at least one anchor element is embedded in the spoke portion and is arranged on an outer face of the hub.

7. The wheel component as recited in claim 6, wherein the anchor element is substantially T-shaped.

8. The wheel component as recited in claim 1, wherein:
   the spoke portion is connected in a materially engaging manner to the spoke reinforcement element, and
   the rim portion is connected in a materially engaging manner to the rim reinforcement element.

9. The wheel component as recited in claim 1, wherein the spoke portion and the rim portion are connected to one another monolithically.

10. The wheel component as recited in claim 1, wherein the at least one spoke is one of a plurality of spokes.

\* \* \* \* \*